US010235061B1

United States Patent
Natanzon et al.

(10) Patent No.: US 10,235,061 B1
(45) Date of Patent: Mar. 19, 2019

(54) GRANULAR VIRTUAL MACHINE SNAPSHOTS

(71) Applicant: EMC IP Holding Company LLC, Hopkinton, MA (US)

(72) Inventors: Assaf Natanzon, Tel Aviv (IL); Saar Cohen, Moshav Mishmeret (IL); Ron Cooper, Tel Aviv (IL); Efri Nattel-Shay, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 36 days.

(21) Appl. No.: 15/275,769

(22) Filed: Sep. 26, 2016

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 9/50* | (2006.01) |

(52) U.S. Cl.
CPC ............ *G06F 3/0619* (2013.01); *G06F 3/065* (2013.01); *G06F 3/0665* (2013.01); *G06F 3/0688* (2013.01); *G06F 3/0689* (2013.01); *G06F 9/5077* (2013.01)

(58) Field of Classification Search
CPC ............................. G06F 3/0665; G06F 9/5077
USPC ....................................................... 711/103
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |

(Continued)

OTHER PUBLICATIONS

U.S. Appl. No. 14/979,897, filed Dec. 28, 2015, Natanzon et al.

(Continued)

*Primary Examiner* — Edward J Dudek, Jr.
*Assistant Examiner* — Sidney Li
(74) *Attorney, Agent, or Firm* — Daly, Crowley, Mofford & Durkee, LLP

(57) ABSTRACT

A computer program product, system, and method for generating coded fragments comprises generating a plurality of thin differential virtual machine disks (VMDKs) associated with a VMDK; receiving, during a first time period starting after the first point in time, one or more first I/Os to be written from a virtual machine (VM) to the VMDK; writing the first I/Os to a first one of the thin differential VMDKs; receiving, during a second time period starting after the first time period, one or more second I/Os to be written from the VM to the VMDK; writing the second I/Os to a second one of the thin differential VMDKs; and generating a second snapshot of the VMDK for a second point in time after the second time period by applying data written to the first and second thin differential VMDKs to a first snapshot of the VMDK for a first point in time.

27 Claims, 7 Drawing Sheets

(56) References Cited

U.S. PATENT DOCUMENTS

| | | |
|---|---|---|
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,738,870 B1 | 5/2014 | Balasubramanian et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,407 B1 | 11/2014 | Balasubramanian et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,699,252 B2 | 7/2017 | Antony |

(56) References Cited

U.S. PATENT DOCUMENTS

| | | |
|---|---|---|
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 2006/0069865 A1 | 3/2006 | Kawamura et al. |
| 2007/0113004 A1 | 5/2007 | Sugimoto et al. |
| 2007/0156984 A1 | 7/2007 | Ebata |
| 2007/0180208 A1* | 8/2007 | Yamasaki ........... G06F 11/2074 711/162 |
| 2010/0058011 A1* | 3/2010 | Satoyama ........... G06F 11/1458 711/162 |
| 2010/0250880 A1* | 9/2010 | Mimatsu ........... G06F 11/1451 711/162 |
| 2010/0299368 A1 | 11/2010 | Hutchins et al. |
| 2014/0095823 A1 | 4/2014 | Shaikh et al. |
| 2015/0373102 A1 | 12/2015 | Antony |
| 2015/0378636 A1 | 12/2015 | Yadav et al. |
| 2016/0378527 A1 | 12/2016 | Zamir |
| 2016/0378528 A1 | 12/2016 | Zamir |

OTHER PUBLICATIONS

EMC Corporation, "EMC Recoverpoint/Ex;" Applied Technology; White Paper; Apr. 2012; 17 Pages.

U.S Non-Final Office Action dated Mar. 14, 2018 for U.S. Appl. No. 14/979,897; 33 pages.

Notice of Allowance dated Aug. 8, 2018 for U.S. Appl. No. 14/979,897; 7 Pages.

Response to U.S. Non-Final Office Action dated Mar. 14, 2018 for U.S. Appl. No. 14/979,897; Response filed Jun. 13, 2018; 13 Pages.

* cited by examiner

GRANULAR VIRTUAL MACHINE SNAPSHOTS

BACKGROUND

Computer data is vital to today's organizations and a significant part of protection against disasters is focused on data protection. Existing data protection systems may provide continuous data protection and snapshot-based replication.

A hypervisor is computer software, firmware, and/or hardware that creates and runs virtual machines (VMs). Hypervisors may provide the ability to generate snapshots of a VM disks (VMDKs). Existing techniques for generating VMDK snapshots may degrade the performance of a production system.

Backup storage systems may include features such as de-duplication that increase the efficiency of storing VMDK snapshots. Some backup storage systems are limited in the number of VMDK snapshots that can be stored, or in how frequently new snapshots can be added.

SUMMARY

Described herein are embodiments of systems and methods for generating snapshots of virtual machine disks (VMDK). In some embodiments, the VMDK snapshots can be generated while having little or no impact on production performance. In various embodiments, the rate at which VMDK snapshots can be generated exceeds the rate at which snapshots can be added to backup storage.

According to one aspect of the disclosure, a method comprises: generating a plurality of thin differential virtual machine disks (VMDKs) associated with a VMDK; receiving, during a first time period starting after the first point in time, one or more first I/Os to be written from a virtual machine (VM) to the VMDK; writing the first I/Os to a first one of the thin differential VMDKs; receiving, during a second time period starting after the first time period, one or more second I/Os to be written from the VM to the VMDK; writing the second I/Os to a second one of the thin differential VMDKs; and generating a second snapshot of the VMDK for a second point in time after the second time period by applying data written to the first and second thin differential VMDKs to a first snapshot of the VMDK for a first point in time.

In various embodiments, generating a second snapshot of the VMDK comprises: generate an aggregate differential VMDK using data written to the first and second thin differential VMDKs, and applying the aggregate differential VMDK to the first snapshot of the VMDK to generate the second snapshot of the VMDK. In one embodiment, generating a plurality of thin differential VMDK comprises: generating a single VMDK file having each of the plurality of thin differential VMDK at different offsets within the file. In some embodiments, generating a second snapshot of the VMDK comprise: applying some data written to the first thin differential VMDK to the first snapshot of the VMDK, and applying all data written to the second thin differential VMDK to the first snapshot of the VMDK.

In certain embodiments, receiving the one or more first I/Os to be written from the VM to the VMDK comprises receiving the one or more first I/Os from a splitter. In one embodiment, the method further comprises storing the first snapshot in a backup storage system, and storing the second snapshot in a backup storage system. In various embodiments, generating the second snapshot of the VMDK comprises sending data written to the first and second thin differential VMDKs to the backup storage system. In certain embodiments, generating the plurality of thin differential VMDKs comprises thin provisioning a plurality of VMDKs.

In some embodiments, the method further comprises writing first metadata describing first I/Os to a journal, writing second metadata describing the second I/Os to the journal, and determining the data written to the first and second thin differential VMDKs using the first and second metadata. In one embodiment, the method further comprises deleting the plurality of VMDKs after generating the second snapshot of the VMDK. In various embodiments, the method further comprises receiving a request to restore the VM to a point in time; determining a most recent VMDK snapshot prior to the requested point in time; determining if thin differential VMDKs are available covering a time period from the VMDK snapshot time to the restore time; if thin differential VMDKs are available, restoring the VM using the VMDK snapshot prior to the requested point in time and the available thin differential VMDKs; and if thin differential VMDKs are not available, restoring the VM using the most recent VMDK snapshot prior to the requested point in time.

In some embodiments, the method further comprises receiving a request to restore the VM to a point in time; receiving an I/O request to read data from the VMDK; determining a time when the requested data was last changed prior to the requested point in time; determining if the requested data is available within a thin differential VMDK covering the time when the requested data was last changed prior to the requested point in time; if a thin differential VMDK is available, reading the requested data from the available thin differential VMDKs; if a thin differential VMDK is not available, reading the requested data from a most recent VMDK snapshot prior to the last change time; and returning the requested data. In one embodiment, the method further comprises receiving an I/O request to write data from the VMDK, and writing the data to a thin different VMDK.

According to another aspect of the disclosure, a system comprises one or more processors, a volatile memory, and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
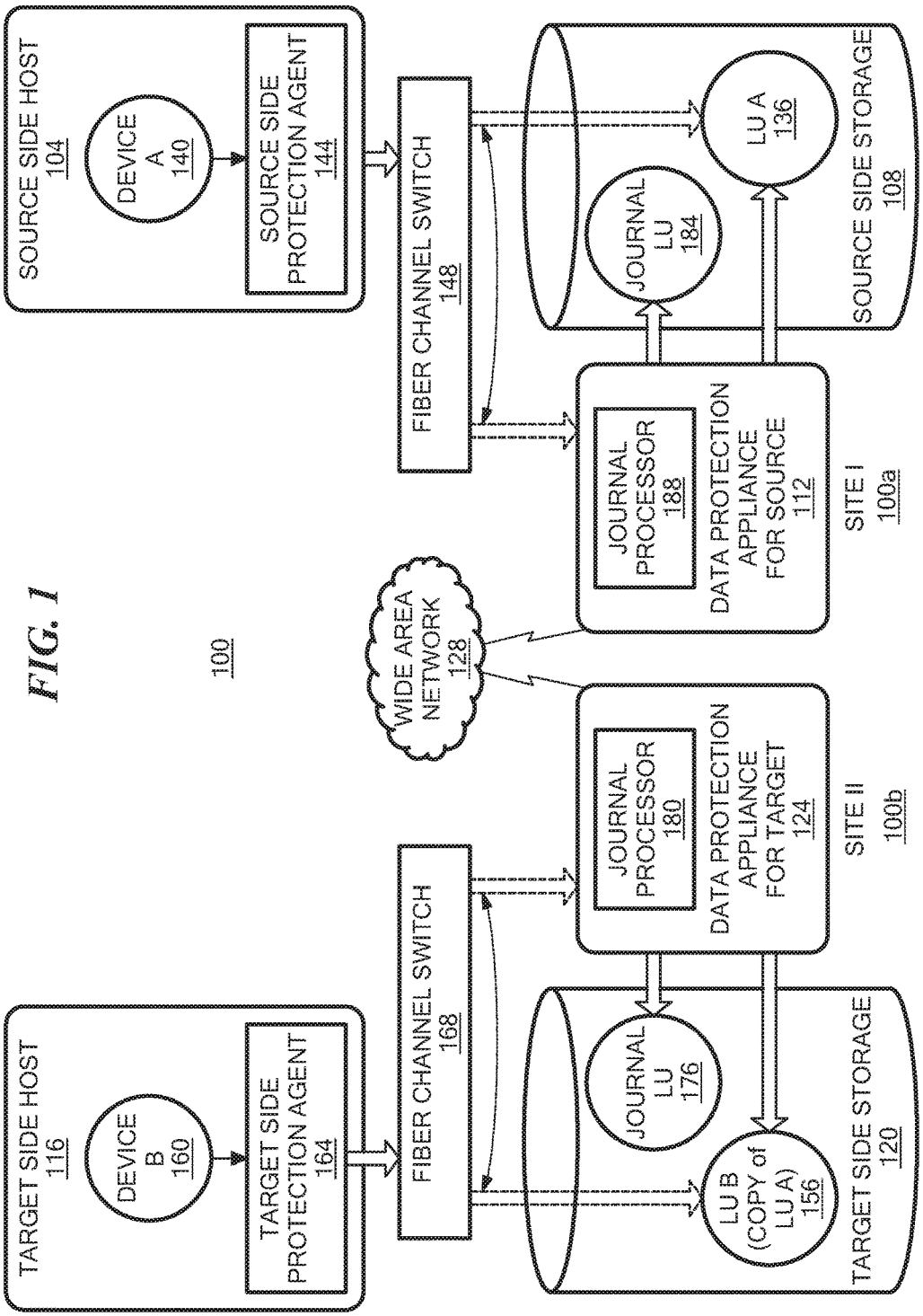
FIG. 1 is a block diagram of a data protection system, according to one embodiment of the disclosure.

Referring to the embodiment of FIG. 1, a data protection system 100 includes two sites: Site I 100a and Site II 100b. Under normal operation Site I 100a may correspond to a source side (i.e., the transmitter within a data replication workflow) of system 100 and Site II 100b may be the target side (i.e., the receiver within a data replication workflow) of the system, as shown in FIG. 1. Thus, during normal operations, the direction of replicate data flow may go from Site I 100a to Site II 100b.

In certain embodiments, Site I and Site II may be remote from one another. In other embodiments, the two sites may be local to one another. In particular embodiments, Site I and Site II may be connected via a local area network (LAN). In other embodiments, the two sites may be connected via a wide area network (WAN), such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments, Site I corresponds to a production site (e.g., a facility where one or more hosts run data processing applications that write data to a storage system and read data from the storage system) and Site II corresponds to a backup or replica site (e.g., a facility where replicated production site data is stored). In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly, Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1., the first SAN includes a first fiber channel switch 148 and the second SAN includes a second fiber channel switch 168. Communication links between each host 104, 116 and its corresponding storage system 108, 120 may be any appropriate medium suitable for data transfer, such as fiber communication channel links. In many embodiments, a host communicates with its corresponding storage system using SCSI commands. Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, the storage systems may be SAN entities that provide multiple LUs for access by multiple SAN initiators. In many embodiments, an LU may be physical or virtual logical entity provided by a storage system for accessing data stored therein. In some embodiments, an LU may be a virtual disk accessed by a virtual machine. In certain embodiments, an LU may be identified by a unique logical unit number (LUN).

In the embodiment of FIG. 1, storage system 108 exposes a logical unit 136, designated as LU A, and storage system 120 exposes a logical unit 156, designated as LU B. LU B may be used for replicating LU A. As such, LU B may be generated as a copy of LU A. In one embodiment, LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access a LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 136 ("LU A"). In some embodiments, the I/O requests include SCSI commands. In many embodiments, an I/O request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or may be a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs.

Referring again to FIG. 1, as described herein above, Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. In other embodiments, a protection agent may be located in a fiber channel switch or in any other device situated in a data path between a host and a storage system or on the storage system itself. In some embodiments wherein, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." The journal may be used to provide access to storage at specified points in time, as discussed further below in conjunction with FIG. 2. In some embodiments, the journal may be stored across multiple LUs (e.g., using striping).

In the embodiment of FIG. 1, the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor may be configured to perform processing described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Embodiments of the data replication system may be provided as physical systems for the replication of physical LUs, or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network based file system and exposes files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a variety of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turns may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each I/O request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation, LU B 156 may be used as a backup of LU A 136. As such, while data written to LU A by host 104 is replicated from LU A to LU B, the target host 116 should not send I/O requests to LU B. To prevent such I/O requests from being sent, protection agent 164 may act as a target side protection agent for host device B 160 and may fail I/O requests sent from host 116 to LU B 156 through host device B 160.

Still referring to FIG. 1, in recovery mode, the target DPA 124 may undo the write transactions in the journal LU 176 so as to restore the target storage system 120 to an earlier state.

In various embodiments, the source storage array 108 may not have snapshot replication capability. In other embodiments, the source storage array 108 may have snapshot replication capability, however this feature may negatively affect production performance (e.g., I/O performance between the source host 104 and the source storage array 108). In particular embodiments, the data protection system 100 may utilize structures and techniques described below in conjunction with FIGS. 3 and 4 to provide snapshot replication of data stored within the source storage array 108 while having little or even no affect on production performance.

Figure 2:
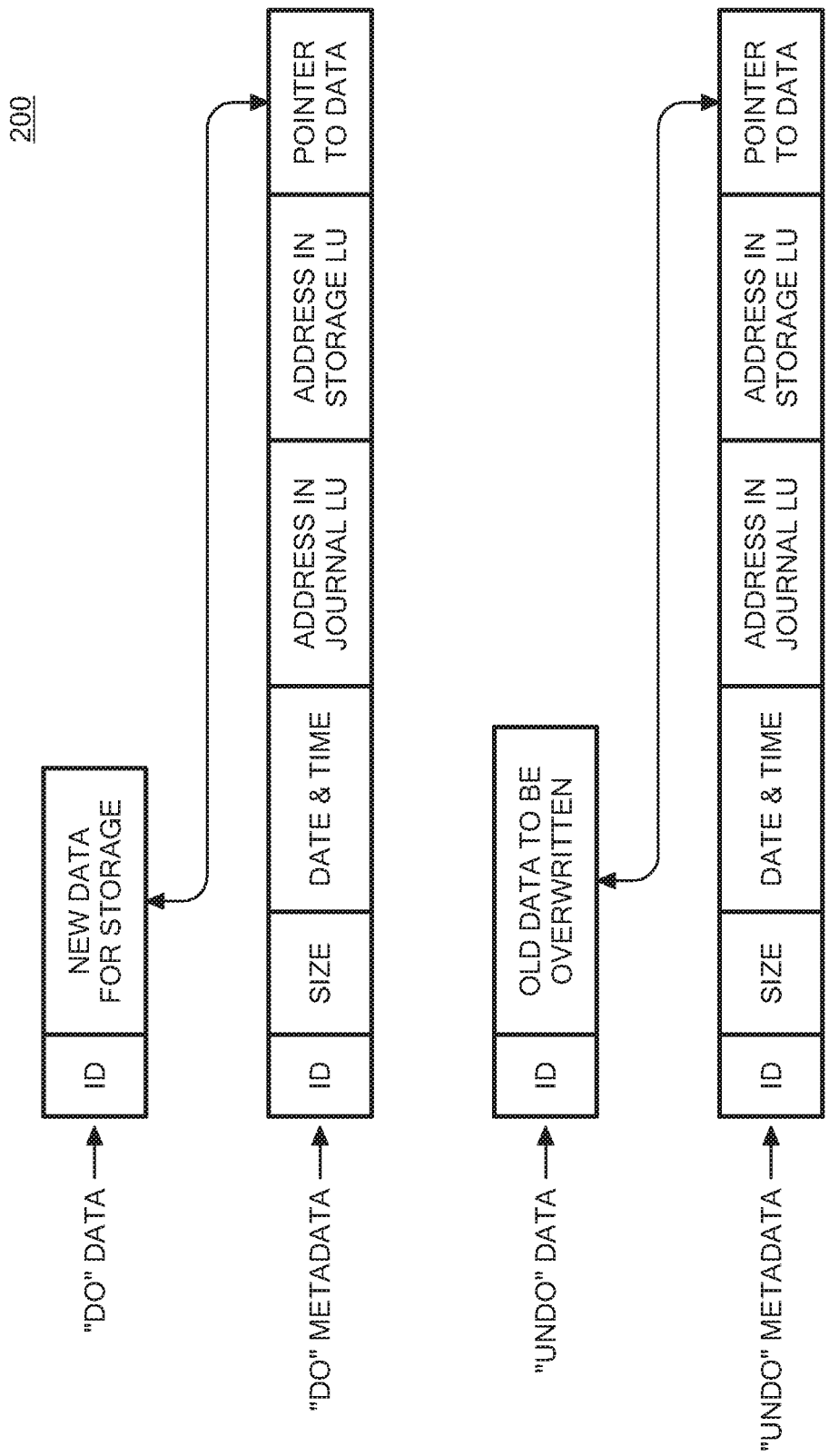
FIG. 2 is a diagram illustrating a journal history of write transactions for a storage system, according to an embodiment of the disclosure.

Referring to the embodiment of FIG. 2, a write transaction 200 may be included within a journal and stored within a journal LU, in accordance with an embodiment. The write transaction 200 includes one or more identifiers; a time stamp indicating the date and time at which the transaction was received by the source DPA; a write size indicating the size of the data block; a location in the journal LU where the data is entered; a location in the target LU where the data is to be written; and the data itself.

Referring briefly to both FIGS. 1 and 2, the transaction 200 may correspond to a transaction transmitted from the source DPA 112 to target DPA 124. The target DPA 124 may record the write transaction 200 in the journal that includes four streams. A first stream, referred to as a "DO" stream, includes a copy of the new data for writing to LU B 156. A second stream, referred to as a "DO METADATA" stream, includes metadata for the write transaction, such as an identifier, a date and time, a write size, the offset within LU B 156 where the new data is written, and a pointer to the offset in the DO stream where the corresponding data is located. A third stream, referred to as an "UNDO" stream, includes a copy of the data being overwritten within LU B 156 (referred to herein as the "old" data). A fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal contains the "undo" information necessary to rollback storage system 120, data that was stored in specific memory locations at a specified point in time may be obtained by undoing write transactions that occurred subsequent to such point in time.

Each of the four streams may hold a plurality of write transaction data. As write transactions are received dynamically by target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Figure 3:
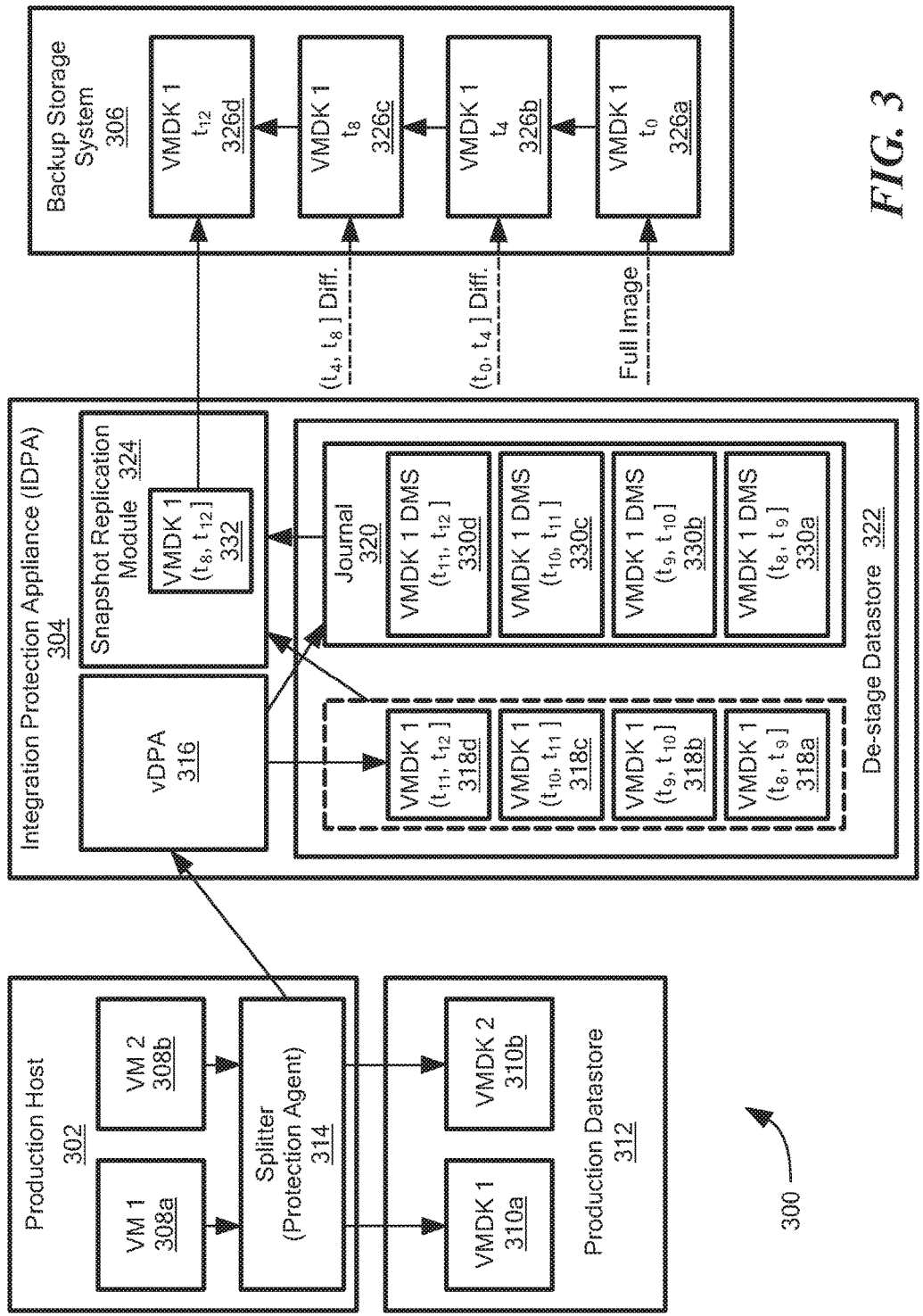
FIG. 3 is a block diagram of a data production system that can provide granular virtual machine (VM) snapshots, according to an embodiment of the disclosure.

Referring to FIG. 3, a data protection system 300 may provide granular virtual machine (VM) snapshots, according to an embodiment of the disclosure. The data protection system 300 includes a production host 302, an integrated data protection appliance (IDPA) 304, and a backup storage system 306.

The production host 302 includes one or more virtual machines (VMs) 308, with two VMs 308a and 308b shown in FIG. 1. Each VM 308 may send I/Os to a corresponding virtual machine disk (VMDK) 310 stored within a production datastore 312. The production host 302 also includes a splitter 314 configured to intercept VM I/Os and to send the I/Os to a data protection appliance (DPA) 316 within the IDPA 304. In the embodiment of FIG. 3, the splitter 314 sends I/Os from a first VM 308a to the DPA 316, but not I/Os from a second VM 308b.

The IDPA 304 includes the DPA 316, a snapshot replication module 324, and a de-stage datastore 322. In some embodiments, the splitter may be the same as or similar to data protection agent 144 in FIG. 1. In certain embodiments, the DPA may be the same as or similar to DPA 124 in FIG. 1. In the embodiment of FIG. 3, the data protection appliance 316 may be implemented as software that can execute within the IDPA 304, and thus is referred to as a virtual data protection appliance (vDPA). In other embodiments, data protection appliance may be a physical appliance separate from the IDPA. In certain embodiments, the vDPA and/or the snapshot replication module may correspond to separate virtual machines running within the IDPA. In one embodiment, the production host and/or the IDPA may be provided as EMC® ESXI® servers. In a particular embodiment, the IDPA may be provided as a cluster (or "farm") of servers, such as a cluster of VMWARE® ESXI® servers. In certain embodiments, the IDPA may be a hyper-converged appliance.

Referring again to FIG. 3, the backup storage system 306 can store a plurality of virtual machine disks (VMDKs) snapshots 326. Each VMDK snapshot 326 is a full image of a production VMDK 310 for a particular point in time. As illustrated in FIG. 3, a first VMDK snapshot 326a may correspond to a snapshot of a first production VMDK 310a at time $t_0$, a second snapshot 326b may correspond to a snapshot at time $t_4$, a third snapshot 326c may correspond to a snapshot at time $t_8$, and a fourth snapshot 326d may correspond to a snapshot at time $t_{12}$. Thus, in the embodiment of FIG. 3, snapshots of VMDK 310a may be added to the backup storage every four (4) time units. In some embodiments, snapshots of a particular production VMDK are added to backup storage every hour. In a particular embodiment, snapshots are added every six (6) hours.

In certain embodiments, the backup storage system may be remote to the data protection system. In other embodiments, the backup storage system may be local to the data protection system. In some embodiments, the backup storage system is a de-duplicate storage system. In one embodiment, the backup storage system may be provided as EMC® DATA DOMAIN®.

In many embodiments the IDPA de-stage datastore may be provided as flash-based storage, allowing fast random I/O access. In some embodiments, the backup storage system is provided as spindle-based storage or another type of storage that has relatively slow I/O access compared with flash storage.

In various embodiments, there may be a limit on how frequently full VMDK snapshots can be added to backup storage (e.g., due to limited network connectivity, bandwidth costs, and/or storage limits). In one embodiment, new snapshots can be added to backup storage at most once per hour. In some embodiments, in order to achieve more granular snapshots, the data protections system may utilize differential VMDK snapshots, as described herein below.

Referring back to FIG. 3, the IDPA 304 includes (or otherwise has access to) de-stage datastore 322. The de-stage datastore 322 may store one or more so-called "thin" differential virtual machine disks (VMDKs) 318 and a journal 320, with four thin differential VMDKs 318a-318d shown in the embodiment of FIG. 3. The thin differential VMDKs 318 are referred to as "differential" because each disk stores only changes that occurred within a given time period (i.e., only writes intercepted from the VM in a given time period). In various embodiments, the differential VMDKs may be conventional thin provisioned VMDKs and, thus, the actual storage capacity of a differential VMDK may be significantly less than the corresponding production VMDK. In various embodiments, a thin provisioned disk is a sparse volume.

Referring again to FIG. 3, the backup storage system 306 is capable of receiving and storing a full VMDK snapshot 326. In addition, the backup storage system 306 can generate a VMDK snapshot 326 by receiving a differential VMDK and applying it to a previously stored full VMDK snapshot. Thus, for example, the backup storage system may receive (e.g., from production datastore 312) a full copy of VMDK 310a for time $t_0$ and store this full image in backup storage 306 as the first VMDK snapshot 326a. Subsequently, the backup storage system 306 may receive (e.g., from the snapshot replication module 324) a differential VMDK having writes between times $t_0$ and $t_4$, and apply these writes to the first VMDK snapshot 326a to generate the second VMDK snapshot 326b, as shown. The resulting second VMDK snapshot 326b is a full image of the production VMDK 310a for time $t_4$.

As illustrated by the embodiment of FIG. 3, a first thin differential VMDK 318a may include copies of all writes from the first VM 308a between times $t_8$ and $t_9$, a second thin differential VMDK 318b may include copies of all writes between times $t_9$ and $t_{10}$, a third thin differential VMDK 318c may include writes between times $t_{10}$ and $t_{11}$, and a fourth thin differential VMDK 318d may include writes between times $t_{11}$ and $t_{12}$. The snapshot replication module 304 is configured to aggregate the thin differential VMDKs 318 to generate a so-called "aggregate" differential VMDK 332 that includes writes for the entire time period covered by the thin differential VMDKs 318. The snapshot replication module 304 can send the aggregate differential VMDK 332 to the backup storage system 306, which applies it to the previous point-in-time VMDK snapshot 326 to produce a new VMDK snapshot 326.

In some embodiments, the IDPA stores multiple thin differential VMDKs within a single VMDK file, wherein each of the thin differential VMDKs is located at a known offset within the single VMDK file. In certain embodiments, this approach may be used to reduce the number of VMDK files created within the IDPA's storage.

In the embodiment of FIG. 3, the aggregate differential VMDK 332 is an aggregate of the four (4) thin differential VMDKs 318a-318d and, thus, includes all writes between times $t_8$ and $t_{12}$. The snapshot replication module 304 can send the aggregate differential VMDK 332 to backup storage 306, which applies it to previous point-in-time VMDK snapshot 326c (i.e., the snapshot for time $t_8$) to produce a new VMDK snapshot 326d for time $t_{12}$. In one embodiment, each thin differential VMDKs includes writes for a given fifteen (15) minute period, and each aggregate differential VMDK includes writes for a given sixty (60) minute period. In certain embodiments, a user can configure these time periods.

Referring back to FIG. 3, the journal 320 includes one or more delta marker streams (DMS's) 330. A DMS 330 includes metadata describing the differences between a full VMDK snapshot 326 and a thin differential VMDK 318, or between one differential VMDK 318 and another thin differential VMDK 318. In some embodiments, a DMS 330 may include a list of storage locations that have been written to in a given time period.

In the embodiment of FIG. 3, a first DMS 330a includes metadata describing changes that occurred to production VMDK 310a between times $t_8$ and $t_9$, a second DMS 330b includes metadata for times $t_9$ to $t_{10}$, a third DMS 330c includes metadata for times $t_{10}$ to $t_{11}$, and a fourth DMS 330d includes metadata for times $t_{11}$ to $t_{12}$. Thus, the first DMS 330a may describe the differences between the full VMDK snapshot 326c (taken at time $t_8$) and thin differential VMDK 318a, the second DMS 330b may describe the differences between thin differential VMDKs 318a and 318b, the third DMS 330c may describe the differences between thin differential VMDKs 318b and 318c, and the fourth DMS 330d may describe the differences between thin differential VMDKs 318c and 318d.

In some embodiments, the journal may be stored on separate physical and/or logical storage from the differential VMDKs.

Referring again to FIG. 3, at any given time, one of the thin differential VMDKs 318 may be treated as the active (or "current") differential snapshot. Likewise, one of the DMS's 330 may be treated as the active/current DMS. As the DPA 316 receives writes from the splitter 314, it may apply those writes to an active thin differential VMDK 318 and to an active DMS 330. For example, referring to the embodiment of FIG. 3, a write occurring at time $t_{11}$ may be written to thin differential VMDK 318c and DMS 330c may be updated to describe the change.

In various embodiments, the DPA can operate in asynchronous mode. In such embodiments, when an I/O is received from the splitter, the DPA may buffer the I/O and send an acknowledgement back to the splitter; the DPA can then asynchronously process the buffered I/Os, applying changes to the active differential VMDK and DMS. In some embodiments, the DPA can operate in either asynchronous or synchronous mode.

In some embodiments, the de-stage datastore may be physically separate from the production datastore, so that writing to the differential VMDKs and journal will not affect production performance (e.g., I/O performance between the VMs 308 and the corresponding VMDKs 310).

Referring back to FIG. 3, the snapshot replication module 324 can generate aggregate differential VMDKs 332 using the thin differential VMDKs 318 and metadata within the journal 320. When generating a VMDK snapshot 326 for a particular production VMDK 310, the snapshot replication module 324 may determine the time at which the last VMDK snapshot 326 was taken and retrieve journal metadata describing all changes that occurred to the VMDK between the last snapshot and the current time (or some other snapshot reference time). For example, the snapshot replication module 324 may retrieve the set of DMS's 330 that span the relevant time period, and combine the DMS's 330 to determine a full description of changes that occurred since the last VMDK snapshot. Using the metadata, the snapshot replication module 324 can read the changes from each of the thin differential VMDKs 318 that span the relevant time period to generate the aggregate differential VMDK 332. If the same storage location was written to multiple times, the snapshot replication module 324 uses the write data from the most recent thin differential VMDK 318 to generate the aggregate differential VMDK 332.

The snapshot replication module 324 can send the aggregate differential VMDK 332 to the backup storage system 306, which generates a new full VMDK snapshot 326 based on the received differential VMDK and the previous snapshot 326. In some embodiments, the rate at which the snapshot replication module generates thin differential VMDKs may exceed the rate at which backup storage can process a differential VMDK and generate a new snapshot based thereon.

Referring to the embodiment of FIG. 3, the snapshot replication module 324 may generate the aggregate differential VMDK 332 at time $t_{12}$. The module 324 determines that the last full snapshot (i.e., snapshot 326c) was made at time $t_8$. The module 324 retrieves and combines metadata from DMS's 330a, 330b, 330c, and 330d (i.e., the metadata describing changes between times $t_8$ and $t_{12}$). The snapshot replication module 324 reads the corresponding changed data from thin differential VMDKs 318a-318d and generates aggregate differential VMDK 332. The module 324 sends the aggregate differential VMDK 332 to the backup storage system 306, which generates and stores a new full VMDK snapshot 326d using the previous snapshot 326c and the changed data. The initial VMDK snapshot (e.g., snapshot 326a in FIG. 3) may be generated by directly copying data from the production VMDK 310a, as previously discussed.

In some embodiments, the snapshot replication module may delete thin differential VMDKs and/or DMS's after a new aggregate differential VMDK is generated (or after a new VMDK snapshot is generated in backup storage). In certain embodiments, the snapshot replication module may generate new thin differential VMDKs and/or DMS's after a new aggregate differential VMDK is generated (or after a new VMDK snapshot is generated in backup storage). In a certain embodiment, thin differential VMDKs may be retained after a corresponding aggregate differential VMDK is generated and/or after a corresponding VMDK snapshot is generated. In some embodiments, this may increase backup granularity by allowing the VM to be restored to points in time between consecutive VMDK snapshots. For example, if full VMDK snapshots are taken every hour, the system may delete thin differential VMDKs every other hour, so that if there are VMDK snapshots at 13:00 and 14:00 in backup storage, and differential VMDKs from 13:00-13:15, 13:15-13:30, 13:30-13:45, and 13:45-14:00 in the IDPA, then those differential VMDKs will not be deleted until time 15:00. In some embodiments, the techniques described herein allow for point-in-time recovery every fifteen minutes going back at least one hour.

Figure 4A:
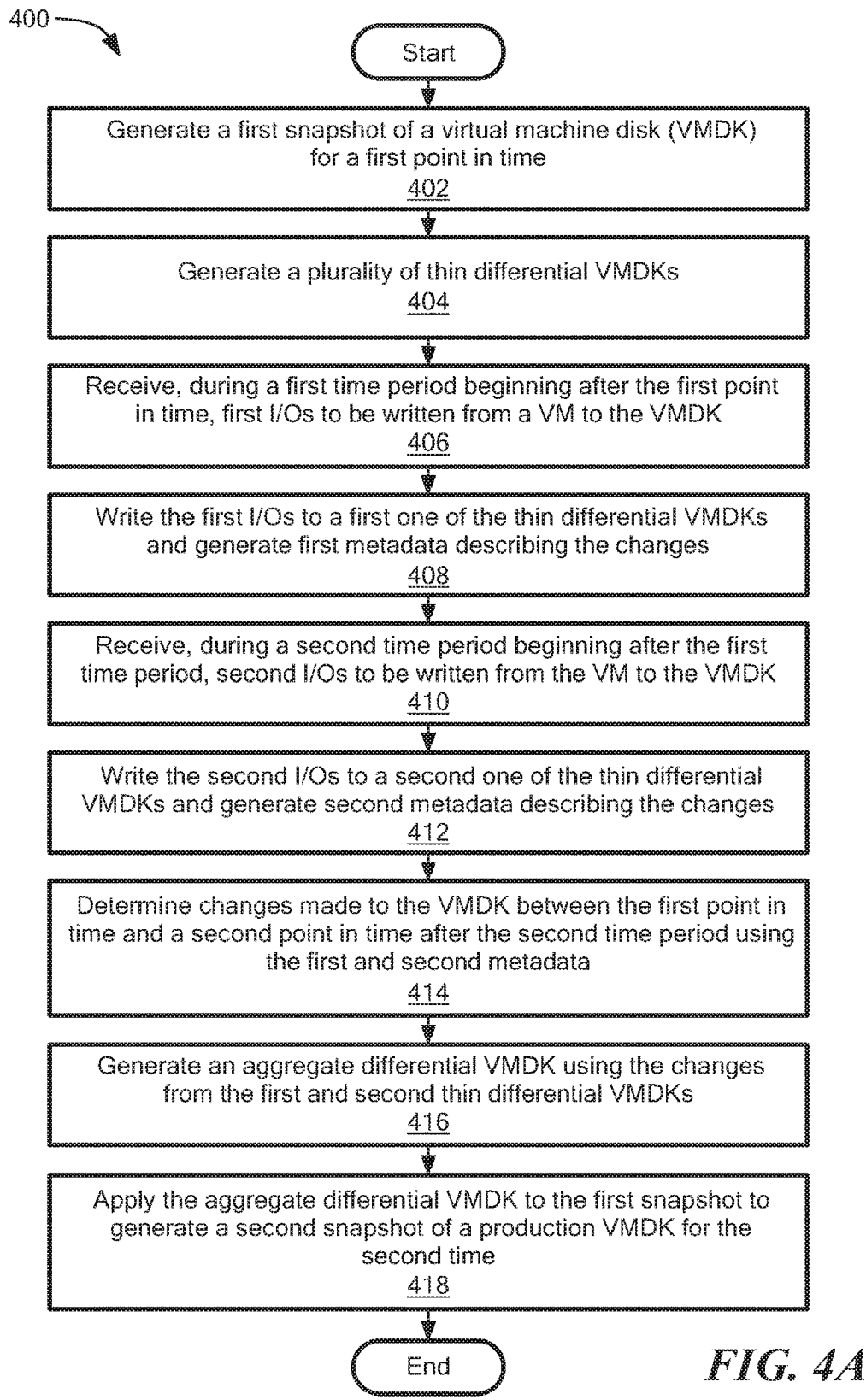
FIG. 4A is flow diagram of a method for generating an initial virtual machine disk (VMDK) snapshot within backup storage, according to an embodiment of the disclosure.
Figure 4B:
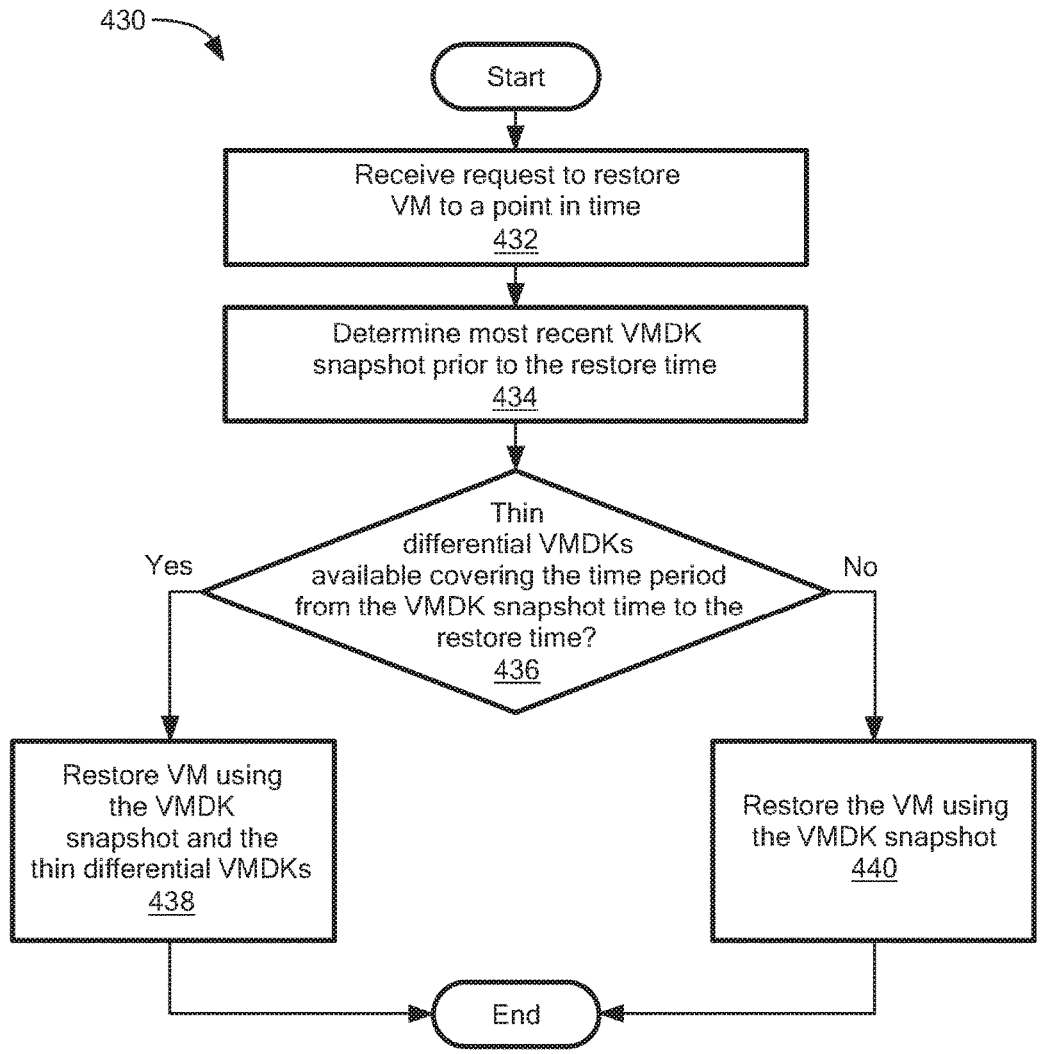
FIG. 4B is flow diagram of a method for restoring a VM, according to an embodiment of the disclosure.
Figure 4C:
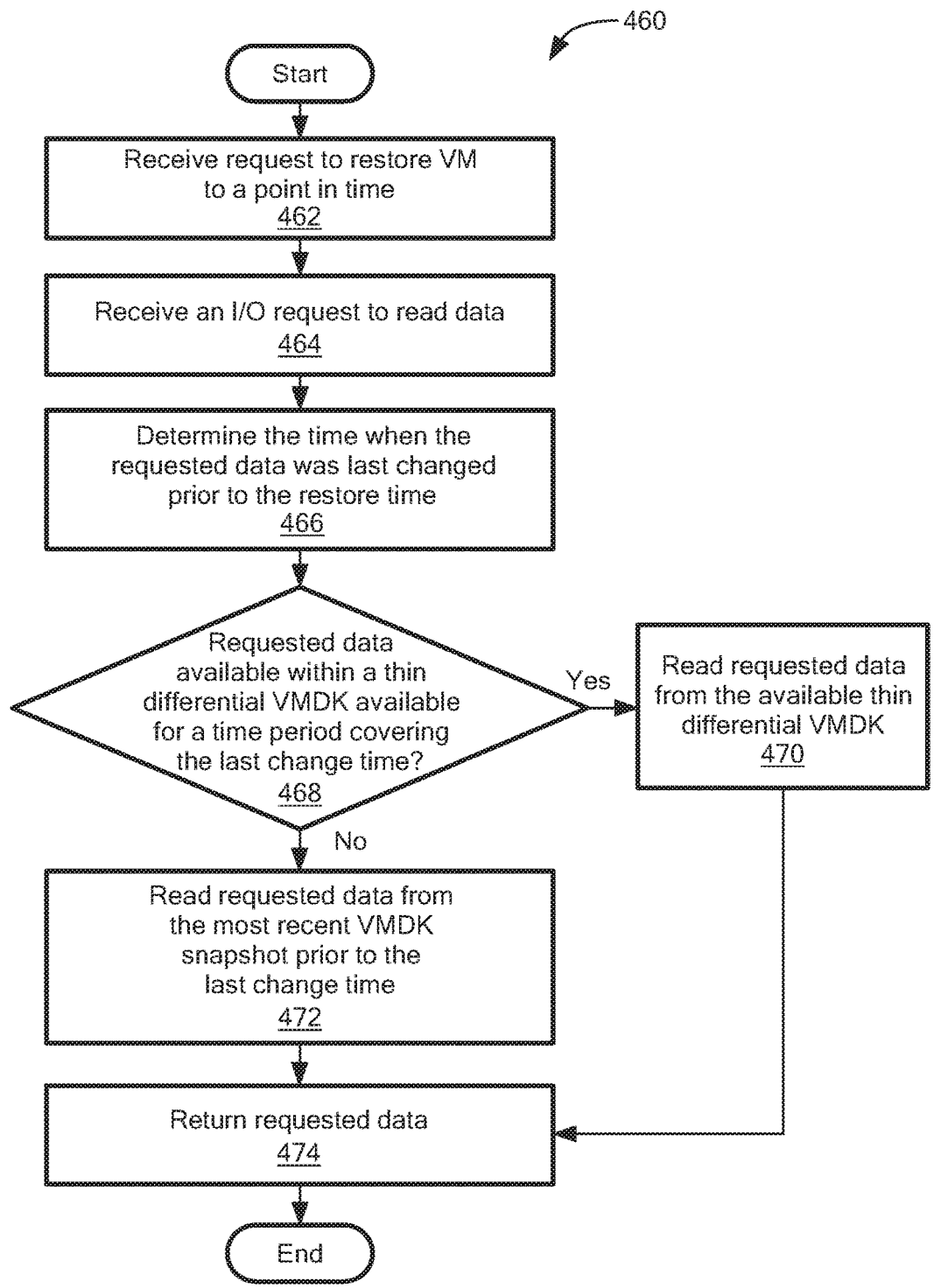
FIG. 4C is flow diagram of another method for restoring a VM, according to one embodiment of the disclosure.

FIGS. 4A-4C are flow diagrams showing illustrative processing that can be implemented within data protection system (e.g., data protection system 300 of FIG. 3). In some embodiments, at least a portion of the processing described herein may be implemented within a data protection appliance (e.g., DPA 316 of FIG. 3). In one embodiment, at least a portion of the processing described herein may be implemented within a snapshot replication module (e.g., snapshot replication module 324 of FIG. 3). Rectangular elements (typified by element 402 in FIG. 4A), herein denoted "processing blocks," represent computer software instructions or groups of instructions. Diamond shaped elements (typified by element 436 in FIG. 4B), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to FIG. 4A, a method 400 can generate granular snapshots of a virtual machine disk (VMDK) (e.g., a production VMDK), according to an embodiment of the disclosure. At block 402, an initial (or "first") VMDK snapshot is generated for some first point in time. In some embodiments, the initial VMDK snapshot is generated based on a full copy of the VMDK. The VMDK may be copied as I/O writes are being sent to the VMDK. In many embodiments, the copy may not be a consistent snapshot for the first point in time. In certain embodiments, differential writes tracked by the IDPA may be applied to the VMDK copy to generate the initial (consistent) snapshot for a first point in time. In certain embodiments, the initial VMDK snapshot is stored within backup storage.

Referring back to FIG. 4A, at block 404, a plurality of thin differential VMDKs may be generated. In some embodiments, the thin differential VMDKs may be generated within a datastore separate from the datastore where the VMDK is located. In many embodiments, the thin differential VMDKs are stored within an internal IDPA datastore (e.g., de-stage datastore 322 in FIG. 3). In various embodiments, the thin differential VMDKs may be thin provisioned. In some embodiments, the plurality of thin differential VMDKs may be generated within a single VMDK file, each at different offsets within the file. In certain embodiments, block 404 may also include generating a plurality of delta mark streams (DMS's) within a journal.

Referring again to FIG. 4A, at block 406, first I/Os may be received during a first time period that begins after the first point in time. The I/Os may correspond to writes from a VM to the production VMDK. In some embodiments, the I/Os may be received from a splitter (e.g., splitter 314 in FIG. 3). In certain embodiments, the I/Os may be received by a data protection appliance (e.g., DPA 316 in FIG. 3). In one embodiment, a splitter sends each I/O to DPA and once DPA acknowledges an I/O, the splitter sends the I/O to the VMDK.

Referring back to FIG. 4A, at block 408, the first I/Os may be written to a first one of the differential VMDKs. In addition, first metadata may be generated to describe changes resulting from the first I/Os. In some embodiments, generated metadata may be stored within a journal (e.g., journal 320 in FIG. 3). In certain embodiments, generating metadata includes adding a list of storage locations that were changed to a DMS associated with the thin differential VMDK.

In some embodiments, the written-to thin differential VMDK may be a thin differential VMDK that stores all changes for the first time period. In certain embodiments, a DPA sends an acknowledgement to a splitter before writing an I/O to the thin differential VMDK (i.e., the DPA may process writes asynchronously).

Referring again to FIG. 4A, at block 410, second I/Os may be received during a second time period that begins after the first time period. In some embodiments, the first and second time periods may be contiguous.

Referring back to FIG. 4A, at block 412, the second I/Os may be written to a second one of the thin differential VMDKs, and second metadata may be generated to describe changes resulting from the second I/Os.

At block 414, the changes made to the VMDK between the first point in time and a second point in time after the second time period may be determined. This determination may utilize the first and second metadata generated at blocks 408 and 412, respectively. In some embodiments, determining the changes made to the VMDK includes consolidating the list of changed locations within a plurality of DMS's.

Referring again to FIG. 4A, at block 418, a second snapshot of the VMDK is generated within the backup storage. The second snapshot is a snapshot of the VMDK at the second point in time, although the snapshot may actually be generated later in time. The second snapshot may be generated by applying changed data from the second one of the thin differential VMDKs to the previous VMDK snapshot (e.g., the first snapshot generated at block 402), where the changed data was previously determined at block 414. In some embodiments, a snapshot replication module (e.g., module 324 in FIG. 3) reads the list of changed locations from the first and second DMS's and, for each changed location, the snapshot replication module reads the changes from the first and second thin differential VMDKs and sends the changes to backup storage (e.g., backup storage system 306 in FIG. 3).

In some embodiments, the first and second thin differential VMDKs may be deleted after the second VMDK is generated. In other embodiments, they may be retained to provide granular VM data recovery for points in time before the second snapshot was taken. In certain embodiments, a new plurality of VMDKs may be generated after the second snapshot is generated (e.g., the method 400 in FIG. 4A may repeat from block 404, but using later points in time).

The embodiment of the method shown in FIG. 4A generates two (2) thin differential VMDKs for each VMDK snapshot. In other embodiments, more than two (2) thin differential VMDKs may be used to increase data recovery granularity. In one embodiment, four (4) thin differential VMDKs may be generated for each VMDK snapshot (e.g., snapshots may be generated hourly and thin differential VMDKs may capture writes in fifteen-minute intervals).

Referring to FIG. 4B, a method 430 can be used to restore a VM, according to an embodiment of the disclosure. At block 432, a request is received to restore the VM to a given point in time (referred to herein as the "restore time").

At block 434, the most recent VMDK snapshot prior to the restore time (or, in some embodiments, prior than or equal to the restore time) within the backup storage is determined. For example, if the requested restore time is 13:30 on a given date and VMDK snapshots are generated hourly, the snapshot at 13:00 for that date may be determined.

At block 436, a determination may be made as to whether a thin differential VMDKs are available for the time period that covers the restore time. Continuing the example above, if thin differential VMDKs are generated for fifteen (15) minute periods, then the thin differential VMDKs for the periods from 13:00-13:15 and 13:15-13:30 may be determined.

Referring back to FIG. 4B, if a suitable thin differential VMDKs are available, then the VM is restored using the most recent VMDK snapshot prior to the restore time and those thin differential VMDKs (block 438). In some embodiments, the VMDK snapshot is read from backup storage and changes within the thin differential VMDKs are applied to the VMDK snapshot. In some embodiments, the changes within the thin differential VMDKs can be identified using journal metadata associated with the thin differential VMDK (e.g., a DMS 330 in FIG. 3). Referring again to FIG. 4B, if suitable thin differential VMDKs are not available, then the VM may be restored directly from the most recent VMDK snapshot within backup storage prior to the restore time (block 440).

In some embodiments, restoring the VM may include overwriting data within the VM's existing VMDK. In other embodiments, a new VMDK may be generated and swapped in for use by the VM.

In some embodiments, thin differential VMDKs may be retained so as to provide a desired level of data recovery granularity.

Referring to FIG. 4C, another method 460 can be used to restore a VM, according to one embodiment of the disclosure. Whereas the method of FIG. 4B can be used to restore the VM by overwriting/replacing its VMDK, the method of FIG. 4C relies on intercepting I/O reads from the VM. At block 462, a request is received to restore the VM to a given point in time (the "restore time"), allowing for immediate access to the VM's data without restoring the VMDK to primary storage.

At block 464, an I/O request may be received to read data. In some embodiments, the I/O request is intercepted by a production agent within a production host (e.g., protection agent 314 in FIG. 3).

Referring back to FIG. 4C, at block 466, the time at which the requested data was last changed prior to the restore time is determined. In certain embodiments, the last change time is determined using journal metadata (e.g., DMS's 330 in FIG. 3).

Referring again to FIG. 4C, at block 468, a determination is made as to whether the requested data exists within a thin differential VMDK (i.e., whether the requested data was written to a thin differential VMDK) for a time period that covers the last change time. If so, then the requested data can be read from that thin differential VMDK and returned to the VM (blocks 470 and 474).

If the requested data is not available within a thin differential VMDK is available, then the requested data may be read from the most recent VMDK snapshot prior to the last change time and returned (blocks 472 and 474). In some embodiments, this includes reading snapshot data from backup storage.

In some embodiments, the method 460 can also handle I/O writes. For example, if an I/O write is received while the VM is in recovery mode (but without the VMDK being restored to primary storage), then the write may be applied to a new thin differential VMDK.

Figure 5:
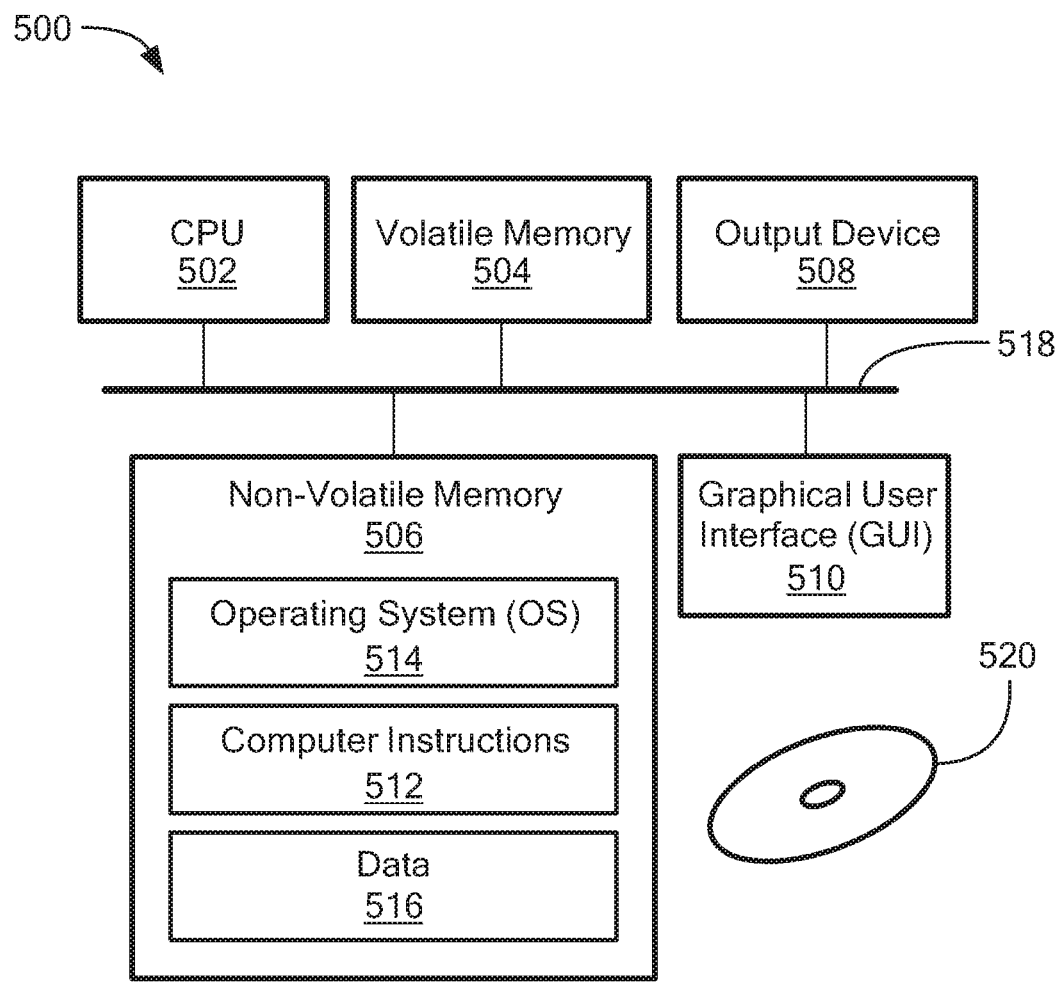
FIG. 5 is a block diagram of a computer on which the methods of FIGS. 4A-4C may be implemented, according to an embodiment of the disclosure.

FIG. 5 shows a computer 500 that can perform at least part of the processing described herein, according to one embodiment. The computer 500 may include a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 may be configured to store computer instructions 512, an operating system 514, and data 516. In one example, the computer instructions 512 are executed by the processor 502 out of volatile memory 504. In one embodiment, an article 520 comprises non-transitory computer-readable instructions. In some embodiments, the computer 500 corresponds to a virtual machine (VM). In other embodiments, the computer 500 corresponds to a physical computer.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method comprising:
generating a plurality of thin differential virtual machine disks (VMDKs) associated with a VMDK of a production host system, the plurality of thin differential VMDKs generated at an integrated data protection appliance (IDPA), the IDPA communicatively coupled to the production host system, wherein generating the plurality of thin differential VMDKs comprises generating a single VMDK file having each of the plurality of thin differential VMDKs at different time-based offsets within the file;
receiving, by a splitter at the production host system during a first time period starting after a first point in time, one or more first I/Os to be written from a virtual machine (VM) of the production host system to the VMDK;
writing, via the IDPA, the first I/Os to a first one of the thin differential VMDKs;
receiving, during a second time period starting after the first time period, one or more second I/Os to be written from the VM to the VMDK;
writing the second I/Os to a second one of the thin differential VMDKs;
aggregating the first one of the thin differential VMDKs and the second one of the thin differential VMDKs to create an aggregate thin differential VMDK; and
generating a second snapshot of the VMDK for a second point in time after the second time period by applying data written to the aggregate thin differential VMDK to a first snapshot of the VMDK for a first point in time;

wherein the first and second I/Os are written to the thin differential VDMKs at a greater frequency than a frequency in which snapshots of VDMKs are taken.

2. The method of claim 1 wherein generating a second snapshot of the VMDK comprises:
applying some data written to the first thin differential VMDK to the first snapshot of the VMDK; and
applying all data written to the second thin differential VMDK to the first snapshot of the VMDK.

3. The method of claim 1 further comprising:
storing the first snapshot in a backup storage system; and
storing the second snapshot in a backup storage system.

4. The method of claim 3 wherein generating the second snapshot of the VMDK comprises sending data written to the first and second thin differential VMDKs to the backup storage system.

5. The method of claim 1 wherein generating the plurality of thin differential VMDKs comprises thin provisioning a plurality of VMDKs.

6. The method of claim 1 further comprising:
writing first metadata describing the first I/Os to a journal;
writing second metadata describing the second I/Os to the journal; and
determining the data written to the first and second thin differential VMDKs using the first and second metadata.

7. The method of claim 1 further comprising deleting the plurality of VMDKs after generating the second snapshot of the VMDK.

8. The method of claim 1 further comprising:
receiving a request to restore the VM to a point in time;
determining a most recent VMDK snapshot prior to the requested point in time;
determining if thin differential VMDKs are available covering a time period from the VMDK snapshot time to the restore time;
if thin differential VMDKs are available, restoring the VM using the VMDK snapshot prior to the requested point in time and the available thin differential VMDKs; and
if thin differential VMDKs are not available, restoring the VM using the most recent VMDK snapshot prior to the requested point in time.

9. The method of claim 1 further comprising:
receiving a request to restore the VM to a point in time;
receiving an I/O request to read data from the VMDK;
determining a time when the requested data was last changed prior to the requested point in time;
determining if the requested data is available within a thin differential VMDK covering the time when the requested data was last changed prior to the requested point in time;
if a thin differential VMDK is available, reading the requested data from the available thin differential VMDKs;
if a thin differential VMDK is not available, reading the requested data from a most recent VMDK snapshot prior to the last change time; and
returning the requested data.

10. The method of claim 9 further comprising:
receiving an I/O request to write data from the VMDK; and
writing the data to a thin differential VMDK.

11. The method of claim 1, wherein the IDPA operates in asynchronous mode, the method further comprising:
receiving, by a data protection appliance of the IDPA, the first I/Os from the splitter; and
buffering the first I/Os before writing the first I/Os to the first one of the thin differential VMDKs.

12. The method of claim 1, wherein the first period of time and the second period of time are each user configurable parameters.

13. A system comprising:
one or more processors;
a volatile memory; and
a non-volatile memory storing computer program code that when executed on the processor causes execution across the one or more processors of a process operable to perform the operations of:
generating a plurality of thin differential virtual machine disks (VMDKs) associated with a VMDK of a production host system, the plurality of thin differential VMDKs generated at an integrated data protection appliance (IDPA), the IDPA communicatively coupled to the production host system, wherein generating the plurality of thin differential VMDKs comprises generating a single VMDK file having each of the plurality of thin differential VMDKs at different time-based offsets within the file;
receiving, by a splitter at the production host system during a first time period starting after a first point in time, one or more first I/Os to be written from a virtual machine (VM) of the production host system to the VMDK;
writing, via the IDPA, the first I/Os to a first one of the thin differential VMDKs;
receiving, during a second time period starting after the first time period, one or more second I/Os to be written from the VM to the VMDK;
writing the second I/Os to a second one of the thin differential VMDKs;
aggregating the first one of the thin differential VDMKs and the second one of the thin differential VMDKs to create an aggregate thin differential VDMK; and
generating a second snapshot of the VMDK for a second point in time after the second time period by applying data written to aggregate thin differential VMDK to a first snapshot of the VMDK for a first point in time;
wherein the first and second I/Os are written to the thin differential VDMKs at a greater frequency than a frequency in which snapshots of VDMKs are taken.

14. The system of claim 13 wherein the computer program code causes execution of a process to generate a second snapshot of the VMDK by:
applying some data written to the first thin differential VMDK to the first snapshot of the VMDK; and
applying all data written to the second thin differential VMDK to the first snapshot of the VMDK.

15. The system of claim 13 wherein the computer program code causes execution of a process further operable to perform the operations of:
storing the first snapshot in a backup storage system; and
storing the second snapshot in a backup storage system.

16. The system of claim 15 wherein generating the second snapshot of the VMDK comprises sending data written to the first and second thin differential VMDKs to the backup storage system.

17. The system of claim 13 wherein generating the plurality of thin differential VMDKs comprises thin provisioning a plurality of VMDKs.

18. The system of claim 13 wherein the computer program code causes execution of a process further operable to perform the operations of:
  writing first metadata describing the first I/Os to a journal;
  writing second metadata describing the second I/Os to the journal; and
  determining the data written to the first and second thin differential VMDKs using the first and second metadata.

19. The system of claim 13 further comprising deleting the plurality of VMDKs after generating the second snapshot of the VMDK.

20. The system of claim 13 wherein the computer program code causes execution of a process further operable to perform the operations of:
  receiving a request to restore the VM to a point in time;
  determining a most recent VMDK snapshot prior to the requested point in time;
  determining if thin differential VMDKs are available covering a time period from the VMDK snapshot time to the restore time;
  if thin differential VMDKs are available, restoring the VM using the VMDK snapshot prior to the requested point in time and the available thin differential VMDKs; and
  if thin differential VMDKs are not available, restoring the VM using the most recent VMDK snapshot prior to the requested point in time.

21. The system of claim 13 wherein the computer program code causes execution of a process further operable to perform the operations of:
  receiving a request to restore the VM to a point in time;
  receiving an I/O request to read data from the VMDK;
  determining a time when the requested data was last changed prior to the requested point in time;
  determining if the requested data is available within a thin differential VMDK covering the time when the requested data was last changed prior to the requested point in time;
  if a thin differential VMDK is available, reading the requested data from the available thin differential VMDKs;
  if a thin differential VMDK is not available, reading the requested data from a most recent VMDK snapshot prior to the last change time; and
  returning the requested data.

22. The system of claim 13 wherein the computer program code causes execution of a process further operable to perform the operations of:
  receiving an I/O request to write data from the VMDK; and
  writing the data to a thin differential VMDK.

23. A computer program product tangibly embodied in a non-transitory computer-readable medium, the computer-readable medium storing program instructions that are executable to:
  generate a plurality of thin differential virtual machine disks (VMDKs) associated with a VMDK of a production host system, the plurality of thin differential VMDKs generated at an integrated data protection appliance (IDPA), the IDPA communicatively coupled to the production host system, wherein generating the plurality of thin differential VMDKs comprises generating a single VMDK file having each of the plurality of thin differential VMDKs at different time-based offsets within the file;
  receive, by a splitter at the production host system during a first time period starting after a first point in time, one or more first I/Os to be written from a virtual machine (VM) of the production host system to the VMDK;
  write, via the IDPA, the first I/Os to a first one of the thin differential VMDKs;
  receive, during a second time period starting after the first time period, one or more second I/Os to be written from the VM to the VMDK;
  write the second I/Os to a second one of the thin differential VMDKs;
  aggregate the first one of the thin differential VMDK s and the second one of the thin differential VMDKs to create an aggregate thin differential VMDK; and
  generate a second snapshot of the VMDK for a second point in time after the second time period by applying data written to the aggregate thin differential VMDKs to a first snapshot of the VMDK for a first point in time;
  wherein the first and second I/Os are written to the thin differential VDMKs at a greater frequency than a frequency in which snapshots of VDMKs are taken.

24. The computer program product of claim 23, wherein the program instructions are further executable to:
  write first metadata describing the first I/Os to a journal;
  write second metadata describing the second I/Os to the journal; and
  determine the data written to the first and second thin differential VMDKs using the first and second metadata.

25. The computer program product of claim 23, wherein the program instructions are further executable to:
  receive a request to restore the VM to a point in time;
  determine a most recent VMDK snapshot prior to the requested point in time;
  determine if thin differential VMDKs are available covering a time period from the VMDK snapshot time to the restore time;
  if thin differential VMDKs are available, restoring the VM using the VMDK snapshot prior to the requested point in time and the available thin differential VMDKs; and
  if thin differential VMDKs are not available, restoring the VM using the most recent VMDK snapshot prior to the requested point in time.

26. The computer program product of claim 23, wherein the program instructions are further executable to:
  receive a request to restore the VM to a point in time;
  receive an I/O request to read data from the VMDK;
  determine a time when the requested data was last changed prior to the requested point in time;
  determine if the requested data is available within a thin differential VMDK covering the time when the requested data was last changed prior to the requested point in time;
  if a thin differential VMDK is available, reading the requested data from the available thin differential VMDKs;
  if a thin differential VMDK is not available, reading the requested data from a most recent VMDK snapshot prior to the last change time; and
  returning the requested data.

27. The computer program product of claim 23, wherein the program instructions are further executable to:
  receive an I/O request to write data from the VMDK; and
  write the data to a thin differential VMDK.

* * * * *